May 3, 1938.

J. G. JACKSON 2,116,487

SEAMLESS BAKING PAN SET

Filed Jan. 13, 1937

INVENTOR
Joseph G. Jackson
BY
ATTORNEY

Patented May 3, 1938

2,116,487

UNITED STATES PATENT OFFICE 2,116,487

SEAMLESS BAKING PAN SET

Joseph G. Jackson, Oak Park, Ill., assignor to The Edward Katzinger Company, Chicago, Ill., a corporation of Illinois Application January 13, 1937, Serial No. 120,397

5 Claims. (Cl. 53—6)

This invention relates to seamless baking pan sets and has for its object to provide means by which, when a plurality of sets are stacked by nesting one within the other, the walls of the pans of the several nested sets will be spaced and any relative movement between the sets of the stack, either longitudinally or transversely of the sets, will be overcome, thereby protecting the inner surfaces of the pans from rubbing action, preventing any tilting of the stack, and providing for air circulation between the walls of the nested pans.

With the above and other objects in view, as will be apparent, this invention consists in the construction, combination and arrangement of parts, all as hereinafter more fully described, claimed and illustrated in the accompanying drawing, wherein:

Figure 1:
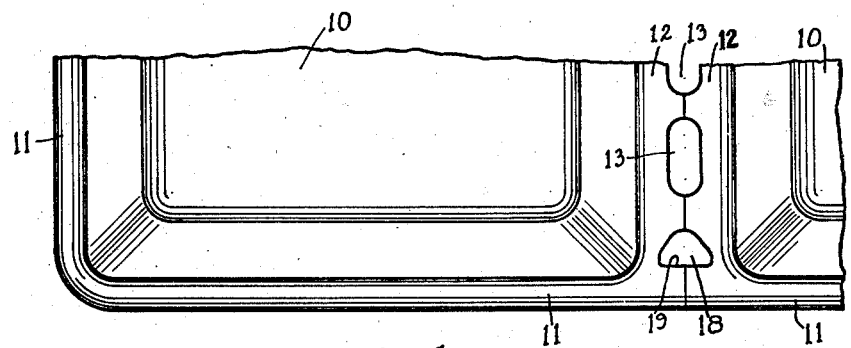
Fig. 1 is a fragmentary plan view of a pan set constructed in accordance with the present invention.
Figures 2, 3:
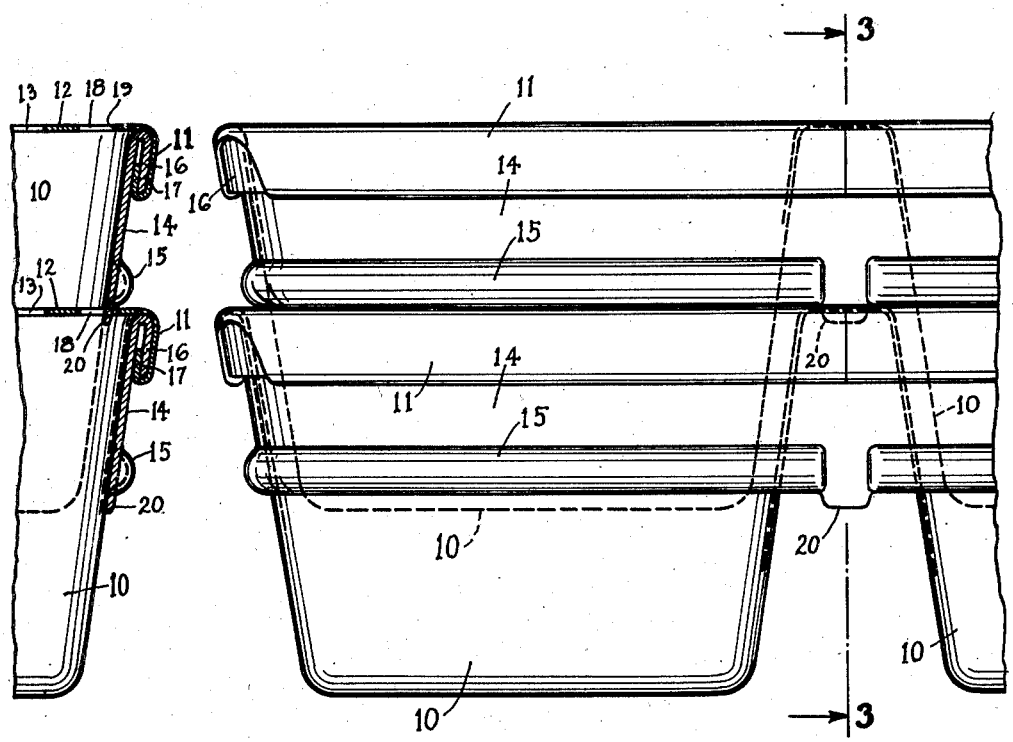
Fig. 2 is a fragmentary side elevation of two pan sets constructed in accordance with the present invention showing the same stacked by nesting the pans of one set in the pans of the other set.
Fig. 3 is a fragmentary vertical section taken along line 3—3 of Fig. 2.

As is well known, seamless baking pans are formed from a single sheet of metal with flanges at the edges of the walls thereof, which in single pans, not incorporated in a pan set, are bent outwardly, downwardly and inwardly about a rectangular wire frame to create outstanding beads at the edges of the pan walls. However, when such seamless pans are incorporated in a pan set, they are placed in spaced substantially parallel positions and are surrounded by a frame of any suitable construction to which the pans are secured in any desired manner. The flanges on the unexposed side walls of the seamless pans of the sets, occupy horizontal positions with their edges abutting and secured one to the other if so desired. These horizontal abutting flanges are pierced by a series of apertures to permit the circulation of air between the pans.

It has been found that when baking pans and baking pan sets are stacked, spaces should be provided between the walls of the nested pans to permit air circulation to cool the pans and to prevent the pan walls from rubbing one against the other, which causes the inner faces of the walls to become discolored and eventually such discoloration will be transferred to the loaf baked within the pan. If the stacked or nested sets can be moved relatively the stack instead of being perpendicular frequently assumes an angular position and in so doing often causes the pan walls to contact and rub one against the other.

The present invention relates exclusively to pan sets wherein the spaces between the pans of the set are closed or partially closed by the flanges on the adjoining side walls of adjacent pans, which is usual when seamless pans are incorporated in the set, and contemplates a centering of the nested sets one within the other so that the walls of the pans thereof are maintained spaced and out of contact and any relative movement of the sets either longitudinally or transversely of the sets is prevented. Thus, when a plurality of sets, made in accordance with the present invention, are nested the resulting stack is and remains substantially perpendicular.

Reference being had more particularly to the drawing, 10 designates a seamless baking pan, formed from a single sheet of material and having the flanges 11 and 12 formed at the edges of the walls thereof. While the flanges 11 and 12 are similar those on the adjacent side walls of adjoining pans 10 when combined in a set are, for convenience, designated 12 and those of the exposed walls of the pan 10, when in a set, are denoted 11. When a number of the pans 10 are combined in a set they are arranged in spaced parallel positions and it is generally customary to position the flanges 12 of the adjacent side walls of adjoining pans horizontally with the longitudinal edges thereof abutting. These abutting longitudinal edges of the flanges 12 may be secured one to the other in any suitable manner if desired. In order to provide means whereby air may circulate between the pans 10 of the set, the abutting flanges 12 between each pair of pans are perforated with a series of oblong apertures 13.

The pans 10 may be secured one to the other in the set in any desired manner. One such construction is illustrated in the drawing and consists of a relatively wide strap or straps 14, completely surrounding the set and resting flush against the exposed walls of the pans 10 of the set. Along its lower edge the strap 14 is provided with a projecting bead 15 substantially semi-circular in cross-section. Upon the nesting of one pan set into another the bead 15 of the strap of the upper pan set rests on the edges of the walls of the pans of the lower set and acts to limit the nesting of the sets thereby creating a space between the walls of the nested pans.

To secure the strap or straps 14 to the pans 10 of the set, the upper longitudinal edge 16 of the strap is bent outwardly and downwardly to lie substantially parallel to and spaced from the body of the strap 14. The flanges 11 on the exposed walls of the pans 10 are bent downwardly over the upper edge 16 of the strap and the extremities 17 thereof are placed between the body of the strap 14 and the downwardly bent longitudinal edge 16 of the strap, where they are gripped and held by the latter. Thus, a series of aligned outstanding beads are formed at the edges of the exposed walls of the pans 10 and the pans are firmly mounted on the strap or straps 14.

The foregoing describes one construction by which a series of seamless pans 10 may be assembled in a pan set but other constructions have heretofore been known and can be used for this purpose.

Adjoining the end walls of the pans 10 the horizontal flanges 12 extending between two adjacent pans are provided with triangular apertures 18 at each end thereof. The base 19 of each aperture 18 is substantially parallel to the plane of the adjoining strap 14 and the sides of the apertures converge inwardly from the ends of its base 19. There is at least one aperture 18 for each pan set and the number and positions thereof may be varied as desired or to suit conditions. The most satisfactory results are probably obtained by having one aperture 18 for each longitudinal side of the set, aligned one with the other transversely of the set, i. e., both apertures being in opposite ends of the same pair of horizontal flanges 12 and coacting with the same space between adjacent pans 10.

Each strap 14 has a lug or ear 20 projecting downwardly below the lower longitudinal edge of the strap 14 in vertical alignment with each aperture 18 provided in the horizontal flanges 12 between adjacent pans 10 of the set. This ear or lug 20 is in width about equal to the length of the base side 19 of the aperture 20. Hence, in each set, there are the same number of lugs or ears 20 as there are apertures 18 in the flanges 12 and each lug or ear 20 is aligned vertically of the set with one of said apertures 18.

Manifestly, when the pans 10 of one pan set as above described, are inserted in or nested with the pans 10 of another similarly constructed set, the ears or lugs 20 on the strap 14 of the upper pan set enter the apertures 18 of the lower pan set and will be positioned adjacent the bases 19 of said apertures. This cooperation between the lugs or ears 20 of one set with the apertures 18 of subjacent set effectively prevents any relative movement between the nested sets either longitudinally or transversely thereof and produces a solid substantial stack of sets that will remain perpendicular with the walls of the nested pans 10 spaced one from the other.

What is claimed is:

1. A baking pan set consisting of a series of individual baking pans held in spaced parallel positions by a strap coacting with the exposed walls thereof, horizontal coplanar abutting flanges carried at the edges of the adjacent side walls of adjoining pans and spanning the space between pans, said flanges having a substantially triangular aperture therein at the end thereof adjacent said strap, and a depending ear on the lower edge of said strap in approximate vertical alignment with the base of said triangular aperture.

2. A baking pan set consisting of a series of individual baking pans held in spaced parallel positions by a strap coacting with the exposed walls thereof, horizontal, coplanar abutting flanges carried at the edges of the adjacent side walls of adjoining pans and spanning the space between pans, said flanges having a substantially triangular aperture therein at the end thereof adjacent said strap, and a depending ear on the lower edge of said strap in approximate vertical alignment with the base of said triangular aperture, said ear adapted to be received in the aperture of a subjacent set upon the nesting of the pans of one set with those of another set.

3. A baking pan set consisting of a series of individual baking pans held in spaced parallel positions by a strap coacting with the exposed walls thereof, horizontal, coplanar abutting flanges carried at the edges of the adjacent side walls of adjoining pans and spanning the space between pans, said flanges having a substantially triangular aperture therein at the end thereof adjacent said strap, and a depending ear on the lower edge of said strap in approximate vertical alignment with the base of said triangular aperture, said ear being in width about equal to the length of the base of the aperture and adapted to be received in the aperture of a subjacent set upon the nesting of the pans of one set with the pans of another set.

4. A baking pan set consisting of a series of individual baking pans held in spaced parallel positions by a strap coacting with the exposed walls thereof, horizontal, coplanar abutting flanges carried at the edges of the adjacent side walls of adjoining pans and spanning the space between pans, said flanges having a substantially triangular aperture therein at the end thereof adjacent said strap, the base of said aperture being parallel to said strap, and a depending ear projecting from the lower edge of the strap and coplanar therewith, having a width somewhat less than the length of the base of the aperture whereby the said ear will be received in the aperture of a subjacent set upon the nesting of the pans of one set in the pans of another set.

5. A baking pan set consisting of a series of individual baking pans held in spaced parallel positions by a strap coacting with the exposed walls thereof, horizontal, coplanar abutting flanges carried at the edges of the adjacent side walls of adjoining pans and spanning the space between pans, said flanges having a substantially triangular aperture therein at the end thereof adjacent said strap, the base of said aperture being parallel to said strap and a depending ear on the lower edge of said strap, in approximate vertical alignment with said aperture, having a width to permit its admission in said aperture, whereby the ear of an upper set will be seated in the aperture of a subjacent set upon the nesting of the pans of one set in the pans of another set.

JOSEPH G. JACKSON.